United States Patent [19]

Gaebel et al.

[11] Patent Number: 4,795,951
[45] Date of Patent: Jan. 3, 1989

[54] D-C COMMUTATOR MOTOR WITH MEANS FOR INTERFERENCE SUPPRESSION

[75] Inventors: Heinz-Ulrich Gaebel; Heinrich Kirchner; Vladimir Maxa, all of Wurzburg; Udo Winter, Kurnach, all of Fed. Rep. of Germany

[73] Assignee: Siemens Aktiengesellschaft, Berlin & Munich, Fed. Rep. of Germany

[21] Appl. No.: 96,692

[22] Filed: Sep. 14, 1987

[30] Foreign Application Priority Data

Sep. 30, 1986 [DE] Fed. Rep. of Germany ....... 3633254

[51] Int. Cl.⁴ .............................................. H04B 15/02
[52] U.S. Cl. ...................................... 318/293; 361/33; 328/167; 328/263
[58] Field of Search ............... 318/244, 245, 246, 434, 318/293; 361/23, 24, 30, 31, 33, 42, 43, 90, 91, 127; 328/165, 167, 263

[56] References Cited

U.S. PATENT DOCUMENTS

| 2,036,285 | 4/1936 | Little | 310/239 |
| 4,455,586 | 6/1984 | McCartney | 361/91 X |
| 4,563,720 | 1/1986 | Clark | 361/91 X |
| 4,568,863 | 2/1986 | Ruof | 318/261 X |
| 4,571,656 | 2/1986 | Ruckman | 361/91 X |
| 4,630,163 | 12/1986 | Cooper et al. | 361/89 X |
| 4,686,614 | 9/1987 | Costello | 361/43 X |

*Primary Examiner*—Bentsu Ro
*Attorney, Agent, or Firm*—Kenyon & Kenyon

[57] ABSTRACT

In order to improve the interference suppression of an electric-motor auxiliary motor-vehicle drive, particularly in the direction of electromagnetic compatibility (EMV), a protective circuit branch (2, 3) with two Zener diodes (D1; D2) or with one varistor (V1) is provided parallel to the armature circuit branch (1) of the commutator motor (M), where, for reducing the number of external solder joints, the Zener-diodes (D1; D2) or the varistor (V1) are combined with the interference suppression capacitors (C1; C2) in common integration component (6) which has only three external terminals.

7 Claims, 1 Drawing Sheet

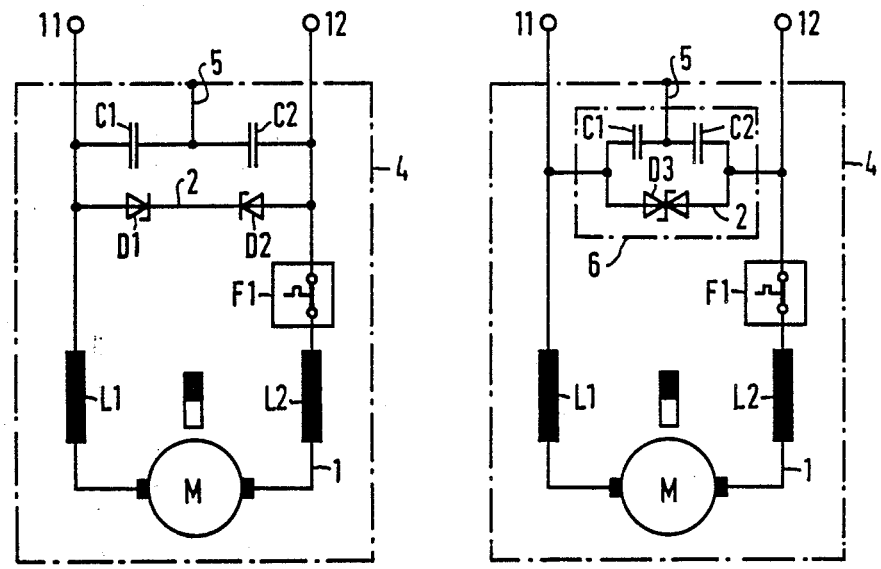
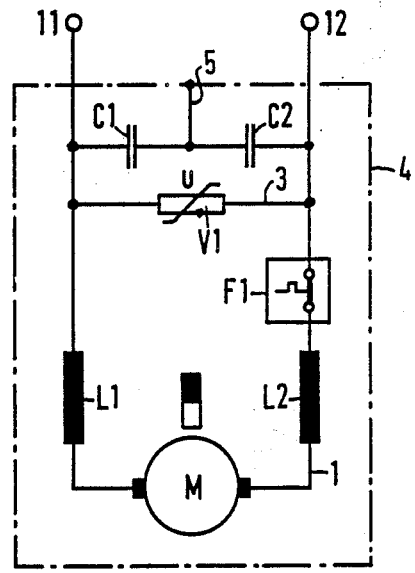
FIG 1  FIG 2
FIG 3

D-C COMMUTATOR MOTOR WITH MEANS FOR INTERFERENCE SUPPRESSION

BACKGROUND OF THE INVENTION

The invention is directed to a d-c commutator motor with a means to suppress interference with other electrical devices, as, e.g., on board a motor vehicle, which interference may be caused by the d-c motor.

The elimination of interference caused by d-c commutator motors, especially radio interference elimination in auxiliary motor vehicle motors, is accomplished, as is well known, by interference elimination inductances connected in series with the brushes and/or interference elimination capacitors arranged in series and parallel to the armature circuit branch of the commutator motor.

It is furthermore known from the reference book "Elektrische Kleinstmotoren und ihr Einsatz" (by Helmut Moczala, Expert-Verlag, 1979, pages 123 and 124), to mount the parts of the interference elimination in universal motors in a common separate housing and to tie the center tap between the interference elimination capacitors metallically connected to the housing in series and parallel to the armature circuit branch.

SUMMARY OF THE INVENTION

It is an object of the invention to improve the interference elimination especially in the sense of electromagnetic compatibility in such a direction that proper operation of the electrical on-board network is assured in spite of the voltage peaks that may occur during the switching of the commutator motor.

According to the invention, the interference problem is solved in a d-c commutator motor of the type discussed above by utilizing a protective circuit branch electrically connected in parallel to the armature circuit and including either at least two Zener diodes arranged anti-series to one another and having a breakthrough voltage in either direction which is higher than the operating voltage or at least one varistor having a threshold voltage in either direction which is higher than the operating voltage.

By the interference suppression means according to the invention it is assured that the voltage peaks occurring when the commutator motor is switched do not get into the onboard network to disturb the proper operation of other electronic circuitry, since through the arrangement of the Zener diodes, the armature current branch of the commutator motor is automatically short-circuited upon the first occurrence of an excessive voltage peak, and thereby, the excessive voltage is broken down via the now conducting protective current branch. The peak of the interference voltage pulse is filtered out by simultaneously changing the pulse width and reducing the flank slope, so that no harmful interference voltage values reach the electronic circuitry via the on-board network.

By designing the Zener diodes to have a breakthrough voltage which is approximately twice the operating voltage, the value of the occurring interference voltage pulse is reduced, on the one hand, to about 20% of the original voltage value and interference of the following electronic circuitry is reliably prevented; and, on the other hand, it is assured by this design that the Zener diodes do not short circuit the armature circuit branch of the commutator motor at relatively low overvoltage values generated by the generator which are harmless for the electronic circuitry connected thereto.

Surprisingly, it has been found that the above-mentioned advantages can also be obtained at substantially lower costs for parts and assembly by only one varistor arranged in the protective circuit branch, the voltage threshold of which is higher than the operating voltage. The voltage threshold of the varistor is to be understood to mean here the two operating points in the symmetrical characteristic, at which the varistor changes from the high-resistance to the electrically conducting state and a voltage-dependent flow of current takes place.

Simultaneously with the electromagnetic compactibility, radio interference suppression can be improved in a simple manner in the d-c commutator provided here by the provision that the protective circuit branch with the Zener diodes arranged in anti-series and the protective circuit branch with the varistor are connected to the terminals of the interference suppression inductances on the operating voltage side in the leads to the armature circuit branch, where the cost for contacting in the assembly of this interference suppression device is reduced advantageously by combining the two Zener diodes in a bidirection or even by combining the Zener diodes or the varistor and the interference suppression capacitors in a common integration component with a total of only three external terminals.

The invention, as well as further advantageous embodiments, will be explained in the following detailed description of preferred embodiments of the invention, making reference to the accompanying drawings, where:

BRIEF DESCRIPTION OF THE DRAWINGS

FIG. 1 shows a first embodiment of the interference suppression circuit according to the invention, in which two Zener diodes connected anti-series are arranged parallel to the armature circuit branch of the commutator motor.

FIG. 2 illustrates a second embodiment of the interference suppression circuit according to the invention, in which interference suppression components arranged parallel to the armature circuit branch of the commutator motor are combined in an integration component having only three external terminals.

FIG. 3 illustrates an embodiment of the interference suppression circuit according to the invention, in which only one varistor is arranged in parallel to the armature circuit branch of the commutator motor.

DETAILED DESCRIPTION OF PREFERRED EMBODIMENTS OF THE INVENTION

FIGS. 1 to 3 show a d-c commutator motor which can be used for instance, as a blower drive or an electric-motor window lifting drive with permanent-magnet excitation which is connected via input terminals 11, 12 to the feeding d-c network of a motor vehicle and is protected against thermal overload by a thermal protector F1 connected into the lead to the armature circuit branch 1 of the commutator motor M. For radio interference suppression, interference suppression inductances L1, L2 respectively, are provided in series with the armature circuit branch 1 in each of the two leads as well as two series-connected interference suppression capacitors C1, C2 connected in parallel to the armature circuit branch 1.

According to FIG. 1, the electromagnetic compatibility as per the invention of the d-c commutator motor is assured by a protective circuit branch 2 arranged parallel to the armature circuit branch 1 of the commutator motor with two Zener diodes D1, D2 arranged anti-series. In the interference suppression circuit according to FIG. 3, a single varistor V1 is connected in parallel to the armature circuit branch 1 of the commutator motor M instead of the two Zener diodes D1, D2, according to the invention.

For simultaneous improvement of the radio interference suppression, an electrical connection 5 is provided between the terminal of the two interference suppression capacitors C1, C2 to each other and the motor housing 4.

FIG. 2 shows the replacement of the two Zener diodes D1, D2 by a bidirectional Zener diode D3, and in addition, the combination according to the invention of the Z-diode D3 connected parallel to the armature circuit branch 1 of the commutator motor M and the interference suppression capacitors C1, C2 to form a single integration component 6. The integration component 6 is arranged in such a manner that in the assembly only one external terminal is required for each of the input terminals 11, 12 of the supply voltage and a third external terminal for the connection with the motor housing 4.

The above described preferred embodiment of the invention is meant to be representative only, as certain changes may be made therein by those skilled in the art without departing from the clear teachings of the invention. Accordingly, reference should be made to the following appended claims which alone define the invention.

What is claimed is:

1. In a d-c commutator motor having interference suppression means and wherein reversal of the direction of rotation is effected by polarity reversal of the operating voltage of an armature winding supplied from a d-c network, the improvement in interference suppression means comprising
    (a) a protective circuit branch electrically connected in parallel to the armature winding, including at least two zener diodes (D1; D2) connected in anti-series; the breakthrough voltage of said at least two zener diodes in each direction of current being higher than the operating voltage;
    (b) a plurality of interference suppression inductances each electrically connected in series with each lead of the armature winding;
    (c) at least two interference suppression capacitors connected in series to one another and then electrically connected in parallel to the armature winding; and
    (d) said protective circuit branch being connected between the series-connected capacitors (C1; C2) and the terminals of the interference suppression inductance (L1; L2) on the side of the operating voltage.

2. In a d-c commutator motor having interference suppression means and wherein reversal of the direction of rotation is effected by changing the polarity of the supply voltage to the armature winding fed from a d-c network, the improvement in interference suppression means comprising
    (a) a protective circuit branch electrically connected in parallel to the armature winding, including at least one varistor (V1), the threshold voltage of said at least one variator in each direction of current being higher than the supply voltage;
    (b) a plurality of interference suppression inductances each electrically connected in series with each lead of the armature winding;
    (c) at least two interference suppression capacitors connected in series to one another and then electrically connected in parallel to the armature winding; and
    (d) said protective circuit branch being connected between the series-connected capacitors (C1; C2) and the terminals of the interference suppression inductances (L1; L2) on the side of the supply voltage.

3. The interference suppression means according to claim 1, wherein said at least two zener diodes (D1; D2) connected in anti-series comprising a bidirectional zener diode.

4. The interference suppression means according to either of claims 1 or 3, wherein the breakthrough voltage of the at least two zener diodes for each direction of current being approximately twice as high as the operating voltage.

5. The interference suppression means according to claim 2, wherein the threshold voltage of said at least one variator for each direction of current being approximately twice as high as the supply voltage.

6. The interference suppression means according to either of claims 1 or 2 wherein:
    (a) said d-c commutator motor including a motor housing; and
    (b) an electrical connection (5) between the junction of said at least two series-connected interference suppression capacitors (C1; C2) and the motor housing (4) of the d-c commutator motor.

7. The interference suppression means according to either of claims 1 or 2 wherein:
    (a) said d-c commutator motor including a motor housing; and
    (b) said protective circuit branch and said at least two interference suppression capacitors (C1; C2) being formed in a common integration component (6) having external terminals for connection to the d-c network and an external terminal to the motor housing (4).

* * * * *